US008677022B2

(12) United States Patent
Bullard et al.

(10) Patent No.: US 8,677,022 B2
(45) Date of Patent: Mar. 18, 2014

(54) METHOD AND APPARATUS FOR UPDATING A GRAPHICAL DISPLAY IN A DISTRIBUTED PROCESSING ENVIRONMENT USING COMPRESSION

(71) Applicant: Citrix Systems, Inc., Fort Lauderdale, FL (US)

(72) Inventors: Justin Bullard, Wilton Manors, FL (US); Toby Opferman, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 13/846,671

(22) Filed: Mar. 18, 2013

(65) Prior Publication Data

US 2013/0229431 A1    Sep. 5, 2013

Related U.S. Application Data

(63) Continuation of application No. 10/906,955, filed on Mar. 14, 2005, now Pat. No. 8,423,673.

(51) Int. Cl.
*G06F 15/16* (2006.01)
*G06K 9/36* (2006.01)

(52) U.S. Cl.
USPC ............ 709/247; 709/232; 709/246; 382/232; 382/238; 382/239; 382/240; 382/244

(58) Field of Classification Search
USPC ................... 709/247, 246; 382/232, 238, 239
See application file for complete search history.

(56) References Cited

U.S. PATENT DOCUMENTS

| 3,596,257 A | 7/1971 | Patel |
|---|---|---|
| 4,013,828 A | 3/1977 | Judice |
| 4,322,795 A | 3/1982 | Lange et al. |
| 4,395,754 A | 7/1983 | Feissel |
| 4,410,916 A | 10/1983 | Pratt et al. |

(Continued)

FOREIGN PATENT DOCUMENTS

| EP | 0 283 735 | 9/1988 |
|---|---|---|
| EP | 0 375 141 | 6/1990 |

(Continued)

OTHER PUBLICATIONS

"A New Source Coding Method Based on LZW Adopting the Least Recently Used Deletion Heuristic" by Hayashi, Kubo, Yamazoto & Sasase; pp. 190-193; May 19, 1993; University of Victoria.

(Continued)

*Primary Examiner* — Tae Kim
(74) *Attorney, Agent, or Firm* — Foley & Lardner LLP; John D. Lanza

(57) ABSTRACT

A system and method for updating a remote display unit that communicates with a computing system are described. The method includes accessing display update information from an update queue that stores drawing commands issued by an application executing on the computing system, caching the display update information, applying a lossy compression algorithm to the display update information to create a lossy display update, and transmitting the lossy update to the remote display. The method also includes applying a lossless compression algorithm to the display update information in the cache to create a lossless display update and transmitting the lossless display update a predetermined of time after transmitting the lossy update.

20 Claims, 4 Drawing Sheets

(56) References Cited

U.S. PATENT DOCUMENTS

| | | |
|---|---|---|
| 4,430,712 A | 2/1984 | Coulson et al. |
| 4,463,424 A | 7/1984 | Mattson et al. |
| 4,499,499 A | 2/1985 | Brickman et al. |
| 4,503,501 A | 3/1985 | Coulson et al. |
| 4,562,423 A | 12/1985 | Humblet |
| 4,691,281 A | 9/1987 | Furui |
| 4,701,745 A | 10/1987 | Waterworth |
| 4,701,871 A | 10/1987 | Sasaki et al. |
| RE32,632 E | 3/1988 | Atkinson |
| 4,796,003 A | 1/1989 | Bentley et al. |
| 4,807,029 A | 2/1989 | Tanaka |
| 4,860,247 A | 8/1989 | Uchida et al. |
| 4,862,392 A | 8/1989 | Steiner |
| 4,870,662 A | 9/1989 | Lindbergh et al. |
| 4,899,149 A | 2/1990 | Kahan |
| 4,903,218 A | 2/1990 | Longo et al. |
| 4,905,141 A | 2/1990 | Brenza |
| 4,928,247 A | 5/1990 | Doyle et al. |
| 4,937,036 A | 6/1990 | Beard et al. |
| 4,949,281 A | 8/1990 | Hillenbrand et al. |
| 4,958,303 A | 9/1990 | Assarpour et al. |
| 4,992,954 A | 2/1991 | Takeda et al. |
| 5,001,478 A | 3/1991 | Nagy |
| 5,016,009 A | 5/1991 | Whiting et al. |
| 5,049,881 A | 9/1991 | Gibson et al. |
| 5,051,745 A | 9/1991 | Katz |
| 5,072,412 A | 12/1991 | Henderson et al. |
| 5,103,303 A | 4/1992 | Shoji et al. |
| 5,115,479 A | 5/1992 | Murayama |
| 5,119,319 A | 6/1992 | Tanenbaum |
| 5,126,739 A | 6/1992 | Whiting et al. |
| 5,140,321 A | 8/1992 | Jung |
| 5,155,485 A | 10/1992 | Sako et al. |
| 5,161,015 A | 11/1992 | Citta et al. |
| 5,164,727 A | 11/1992 | Zakhor et al. |
| 5,231,697 A | 7/1993 | Yamada |
| 5,233,701 A | 8/1993 | Nakata |
| 5,241,625 A | 8/1993 | Epard et al. |
| 5,269,003 A | 12/1993 | Roskowski et al. |
| 5,305,440 A | 4/1994 | Morgan et al. |
| 5,307,456 A | 4/1994 | MacKay |
| 5,309,555 A | 5/1994 | Akins et al. |
| 5,315,698 A | 5/1994 | Case et al. |
| 5,317,732 A | 5/1994 | Gerlach et al. |
| 5,321,806 A | 6/1994 | Meinerth et al. |
| 5,339,411 A | 8/1994 | Heaton, Jr. |
| 5,345,588 A | 9/1994 | Greenwood et al. |
| 5,347,578 A | 9/1994 | Duxbury |
| 5,351,129 A | 9/1994 | Lai |
| 5,357,623 A | 10/1994 | Megory-Cohen |
| 5,359,712 A | 10/1994 | Cohen et al. |
| 5,384,568 A | 1/1995 | Grinberg et al. |
| 5,388,197 A | 2/1995 | Rayner |
| 5,390,318 A | 2/1995 | Ramakrishnan et al. |
| 5,394,531 A | 2/1995 | Smith |
| 5,404,316 A | 4/1995 | Klingler et al. |
| 5,406,279 A | 4/1995 | Anderson et al. |
| 5,414,457 A | 5/1995 | Kadowaki et al. |
| 5,414,704 A | 5/1995 | Spinney |
| 5,426,752 A | 6/1995 | Takahasi et al. |
| 5,434,992 A | 7/1995 | Mattson |
| 5,442,771 A | 8/1995 | Filepp et al. |
| 5,455,576 A | 10/1995 | Clark et al. |
| 5,461,711 A | 10/1995 | Wang et al. |
| 5,469,540 A | 11/1995 | Powers et al. |
| 5,473,742 A | 12/1995 | Polyakov et al. |
| 5,485,460 A | 1/1996 | Schrier et al. |
| 5,491,808 A | 2/1996 | Geist, Jr. |
| 5,515,111 A | 5/1996 | Guedalia |
| 5,515,508 A | 5/1996 | Pettus et al. |
| 5,521,597 A | 5/1996 | Dimitri |
| 5,537,551 A | 7/1996 | Denenberg et al. |
| 5,537,635 A | 7/1996 | Douglas |
| 5,550,965 A | 8/1996 | Gabbe et al. |
| 5,561,786 A | 10/1996 | Morse |
| 5,566,288 A | 10/1996 | Koerhsen |
| 5,572,206 A | 11/1996 | Miller et al. |
| 5,574,845 A | 11/1996 | Benson et al. |
| 5,579,469 A | 11/1996 | Pike |
| 5,579,507 A | 11/1996 | Hosouchi et al. |
| 5,588,138 A | 12/1996 | Bai et al. |
| 5,651,136 A | 7/1997 | Denton et al. |
| 5,652,854 A | 7/1997 | Wong |
| 5,701,451 A * | 12/1997 | Rogers et al. ............... 1/1 |
| 5,717,879 A | 2/1998 | Moran et al. |
| 5,717,893 A | 2/1998 | Mattson |
| 5,729,710 A | 3/1998 | Magee et al. |
| 5,740,171 A | 4/1998 | Mazzola et al. |
| 5,742,797 A | 4/1998 | Celi et al. |
| 5,757,795 A | 5/1998 | Schnell |
| 5,757,925 A | 5/1998 | Faybishenko |
| 5,761,734 A | 6/1998 | Pfeffer et al. |
| 5,767,849 A | 6/1998 | Borgendale et al. |
| 5,771,034 A | 6/1998 | Gibson |
| 5,771,383 A | 6/1998 | Magee et al. |
| 5,784,070 A | 7/1998 | Furuhashi et al. |
| 5,802,281 A | 9/1998 | Clapp et al. |
| 5,826,027 A | 10/1998 | Pedersen et al. |
| 5,835,959 A | 11/1998 | McCool et al. |
| 5,850,632 A | 12/1998 | Robertson |
| 5,864,678 A | 1/1999 | Riddle |
| 5,864,711 A | 1/1999 | Mairs et al. |
| 5,874,960 A | 2/1999 | Mairs et al. |
| 5,877,757 A | 3/1999 | Baldwin et al. |
| 5,886,701 A * | 3/1999 | Chauvin et al. ............. 345/418 |
| 5,886,707 A | 3/1999 | Berg |
| 5,913,230 A | 6/1999 | Richardson |
| 5,918,019 A | 6/1999 | Valencia |
| 5,926,226 A * | 7/1999 | Proctor et al. ............. 375/240.22 |
| 5,944,791 A | 8/1999 | Scherpbier |
| 5,949,975 A | 9/1999 | Batty et al. |
| 5,961,588 A | 10/1999 | Cooper et al. |
| 5,963,551 A * | 10/1999 | Minko ............. 370/356 |
| 5,968,132 A | 10/1999 | Tokunaga et al. |
| 5,983,190 A | 11/1999 | Trower et al. |
| 5,999,179 A | 12/1999 | Kekic et al. |
| 5,999,950 A | 12/1999 | Krueger et al. |
| 6,014,133 A | 1/2000 | Yamakado et al. |
| 6,016,535 A | 1/2000 | Krantz et al. |
| 6,023,749 A | 2/2000 | Richardson |
| 6,034,689 A | 3/2000 | White et al. |
| 6,052,120 A | 4/2000 | Nahi et al. |
| 6,054,943 A | 4/2000 | Lawrence |
| 6,057,857 A | 5/2000 | Bloomfield |
| 6,061,714 A | 5/2000 | Housel et al. |
| 6,073,192 A | 6/2000 | Clapp et al. |
| 6,081,623 A | 6/2000 | Bloomfield et al. |
| 6,161,126 A | 12/2000 | Wies et al. |
| 6,233,226 B1 | 5/2001 | Gringeri et al. |
| 6,253,212 B1 | 6/2001 | Loaiza et al. |
| 6,363,511 B1 | 3/2002 | Massoudi |
| 6,653,954 B2 | 11/2003 | Rijavec |
| 6,753,870 B2 | 6/2004 | Deering et al. |
| 6,934,818 B2 | 8/2005 | Okada |
| 7,009,533 B1 | 3/2006 | Wegener |
| 7,024,046 B2 | 4/2006 | Dekel et al. |
| 7,028,025 B2 | 4/2006 | Collins |
| 7,068,398 B2 | 6/2006 | Rijavec |
| 7,127,525 B2 | 10/2006 | Coleman et al. |
| 7,185,356 B2 | 2/2007 | Fujinami |
| 7,218,784 B1 * | 5/2007 | Zeck et al. ............. 382/232 |
| 7,219,309 B2 | 5/2007 | Kaasila et al. |
| 7,222,306 B2 | 5/2007 | Kaasila et al. |
| 7,287,220 B2 | 10/2007 | Kaasila et al. |
| 7,289,684 B2 | 10/2007 | Nakano et al. |
| 7,395,345 B2 | 7/2008 | Fallon |
| 7,483,583 B2 | 1/2009 | Glickman |
| 7,565,441 B2 * | 7/2009 | Romanik et al. ............. 709/234 |
| 8,275,897 B2 | 9/2012 | Fallon |
| 2002/0015249 A1 | 2/2002 | Takayama et al. |
| 2002/0048450 A1 | 4/2002 | Zetts |
| 2002/0159653 A1 * | 10/2002 | Dekel et al. ............. 382/282 |
| 2002/0196279 A1 | 12/2002 | Bloomfield et al. |
| 2003/0005140 A1 | 1/2003 | Dekel et al. |

(56) References Cited

U.S. PATENT DOCUMENTS

| | | | |
|---|---|---|---|
| 2003/0046432 | A1* | 3/2003 | Coleman et al. .............. 709/247 |
| 2003/0059096 | A1 | 3/2003 | Dekel et al. |
| 2003/0084052 | A1 | 5/2003 | Peterson |
| 2003/0090398 | A1 | 5/2003 | Rijavec |
| 2003/0090706 | A1 | 5/2003 | Rijavec |
| 2003/0090709 | A1 | 5/2003 | Rijavec |
| 2004/0010622 | A1* | 1/2004 | O'Neill et al. ................ 709/247 |
| 2004/0208163 | A1 | 10/2004 | Patel et al. |
| 2004/0222995 | A1* | 11/2004 | Colle ............................ 345/545 |
| 2005/0114380 | A1* | 5/2005 | Eldar et al. .................... 707/102 |
| 2005/0129323 | A1 | 6/2005 | Glickman |
| 2006/0184614 | A1* | 8/2006 | Baratto et al. ................ 709/203 |

FOREIGN PATENT DOCUMENTS

| | | |
|---|---|---|
| EP | 0 495 612 A2 | 7/1992 |
| EP | 0 684 582 A3 | 11/1995 |
| EP | 0 684 583 A2 | 11/1995 |
| EP | 0 691 628 | 1/1996 |
| EP | 0 734 144 A2 | 9/1996 |
| EP | 0 739 140 | 10/1996 |
| EP | 0 818 753 A2 | 1/1998 |
| EP | 0 836 145 | 4/1998 |
| EP | 1 152 594 | 11/2001 |
| GB | 2 136 171 | 9/1984 |
| GB | 2 323 946 A | 10/1998 |
| JP | 06-125363 | 5/1994 |
| WO | WO-94/03853 | 2/1994 |
| WO | WO-95/20863 | 8/1995 |
| WO | WO-97/18635 | 5/1997 |
| WO | WO-97/28623 A3 | 8/1997 |
| WO | WO-01/92973 | 12/2001 |

OTHER PUBLICATIONS

"Cisco Distributed Director," Posted Feb. 21, 1997, 16 pages, [Online] [Retrieved on Dec. 4, 1997] Retrieved from the Internet<URL:http://www.cisco.com/wart/public/751/distdir/dd_wp.htm>.
"Creating a Wider Bus Using Caching Techniques" by Citron & Rudolph; Institute of Computer Science, Hebrew University, Jerusalem Israel, Copyright 1995 IEEE.
"The Norton Utilities Version 5.0 Disk Explorer", Copyright 1990 Peter Norton Computing, Inc.; pp. 28-54; Santa Monica, CA.
"Word Based Data Compression Schemes" by Bar-Ness & Peckham, Copyright 1989, pp. 300-303, The Center for Communication and Signal Processing Research Department of Electrical Engineering, NJIT Netwark, NJ.
Amir Said et al., "An Image Multiresolution Representation for Lossless and Lossy Compression", IEEE Transactions on Image Processsing, IEEE Service Center, 5(9): Sep. 1996.
Anonymous: "Citrix Metraframe 1.8-Backgrounder", Citrix Documentation, Apr. 4, 1999.
Crusty, "The Unofficial XviD FAQ", Web Page, Mar. 4, 2004, pp. 1-50, XP002338686, p. 8: paragraph 2-5, p. 31: paragraph 5-6.
Cruz, G. and Hill, R., "Capturing and Playing Multimedia Events with STREAMS", in Proceedings of ACM Multimedia '94, San Francisco, CA, Oct. 15-20, 1994, pp. 193-200.
De Alwis, "Screen Capturing and Playback Using VNC", Web Page (Online), Oct. 31, 2004, pp. 1-2, XP002389238, available at: http://www.cs.ubc.ca/(bsd/vncrecording.html.
European Search Report, Application No. EP03005803.6, 3 pages.
European Search Report, Application No. EP03005804.4, 3 pages.
European Search Report, Application No. EP03005805.1, 3 pages.
European Search Report, Application No. EP03005806.9, 3 pages.
Foreign Search Report for 10186695.2 dated Feb. 14, 2011.
Freeman, H., "A Scheme for the Efficient Encoding of Graphical Data for Communication and Information Processing", Proceedings of the Electronics Congress—Advanced in Electronics, Rassegna, IT, pp. 340-348, Mar. 24, 1969.

Freeman, H., "Computer Processing of Line-Drawings Images", ACM Computing Survey, New York, NY, US, vol. 6, No. 1, pp. 57-97, Mar. 1974.
Gilbert et al., "Globally progressive interactive web delivery", Infocom '99, 18 Annual Joint Conference of teh IEEE Computer and Communication Societies, Proceedings IEEE New York, NY, USA, p. 1291-99, Mar. 21, 1999.
IBM Technical Disclosure Bulletin, Mechanism for Finding Substitute Fonts in a Conference-Enabled X Windows Application, vol. 41, No. 01, Jan. 1998, pp. 137-142.
IBM Technical Disclosure Bulletin, "Remote Desktop Environments Reflected in Local Desktop Windows", vol. 36, No. 3, Mar. 1993, pp. 421-426.
International Search Report to PCT/US2006/000888, (Aug. 31, 2006), 9 pages.
International Search Report to PCT/US2006/00887 (Jul. 24, 2006), 8 pages.
International Search Report, PCT/US2006/008957, date of mailing Mar. 8, 2006.
International Search Report, PCT/US2006/009204, date of mailing Dec. 7, 2006.
Lamming, M.G., "Towards a Human Memory Prosthesis", Technical Report EPC-91-116, Copyright.RTM. Rank Xerox EuroPARC, Published in Proceedings of International Workshop Lecture Notes in Computer Science '91, Dagstuhl, Berlin, Jul. 1991.
Lamming, M.G., and Newman, W.M., "Activity-based Information Retrieval Technology in Support of Personal Memory," Technical Report EPC-91-103.1, Copyright.RTM. Rank Xerox EuroPARC 1991, pp. 1-16.
Murray et al., "1.5 Move-to-Front Coding", 4 pp. 16-19, 1995.
Notice of Allowance Office Action on U.S. Appl. No. 10/906,955 dated Jan. 16, 2013.
Office Action on U.S. Appl. No. 10/906,955 dated Nov. 29, 2010.
Office Action on U.S. Appl. No. 10/906,955 dated Jul. 19, 2011.
Office Action on U.S. Appl. No. 10/906,955 dated Dec. 10, 2008.
Office Action on U.S. Appl. No. 10/906,955 dated Mar. 29, 2010.
Office Action on U.S. Appl. No. 10/906,955 dated Mar. 29, 2011.
Office Action on U.S. Appl. No. 10/906,955 dated May 15, 2008.
Office Action on U.S. Appl. No. 10/906,955 dated May 27, 2009.
Official Notification for IL 185893 dated May 18, 2011.
Patents on data compression algorithms; available web site: www.iapr-ic.dimi.uniud.it; accessed on: Mar. 31, 1998; pp. 1-10.
Pedersen, E.R., McCall, K., Moran, T.P., and Halasz, F.G., "Tivoli: An Electronic Whiteboard for Informal Workgroup Meetings," Interchi '93, Apr. 24-29, 1993, pp. 391-398.
Reilly, "Today's Linux screen capture technology", NEWSFORGE, (Online), Aug. 17, 2004, pp. 1-3, XP002389239, available at: http://software.newsforge.com/article.
Rhyne, J.R., and Wolf, C.G., "Tools for Supporting the Collaborative Process," in Proceedings of the ACM Symposium on User Interface Software and Technology, Monterey, California, Nov. 15-18, 1992, pp. 161-170.
Sandklef, H, "Testing Applications with XNEE", Linux Journal (Online), 2004, pp. 1-6, vol. 2004, No. 117, ISSN:1075-3583, ACM Digital Library, available at: http://portal.acm.org/citation.cfm?id=959336.959341&coll=GUIDE&d1=ACM&idx=J508&part=periodical&WantType=periodical&title=Linux%20Journal.
Sandklef, H, "XNEE Manual", Manual Version 1.08D, Oct. 2003, available http://web.archive.org/web/20040627125613/www.gnu.org/software/xnee/www/manual/xnee.pdf.
ScreenPlay User's Guide, Release 2.0, Copyright. 1991-1993, RAD Technologies, Inc., Palo Alto, California, pp. 1-4, 9, 12-14, 30-37, and 44-66.
Stanonik, R, "Recording/Playing Both Gaze Date and Compute Interaction", Nov. 30, 2000, available at: http://hci.ucsd.edu/eye/gaze.txt.
Stanonik, R, "Reversing the VNC Record File", Mar. 18, 2002, pp. 1-3, available at: http://www.archive.org/web/20060703115503/http://hci.ucsd.edu/eye/reversing.txt.
Tierling, "Gezaehmtes Monster", CT Magazin Fuer Computer Technik, Heise Zeitschfriften Verlag, Hanover, DE, 10: p. 226-28, 230, 23, 1998.

(56) References Cited

OTHER PUBLICATIONS

WebTV, "WebTV System Guide", http://developer.webtv.net/authoring/sysgde/sysgde.html, Sep. 13, 2000, pp. 1-12.

Wolf, C.G., Rhyne, J.R., and Briggs, L.K., "Communication and Information Retrieval with a Pen-based Meeting Support Tool," CSCW 92 Proceedings, Nov. 1992, pp. 322-329.

Written Opinion of International Searching Auhtority, PCT/US2006/009204, date of mailing Dec. 7, 2006.

Written Opinion of International Searching Authority, PCT/US2006/008957, date of mailing Mar. 8, 2006.

Written Opinion of teh International Searching Authority to PCT/US2006/00887 (Jul. 24, 2006), 19 pages.

Written Opinion of the International Search Authority to PCT/US2006/000888, (Aug. 31, 2006), 14 pages.

Zeldovich, et al., "Interactive performance measurement with VNCplay", USENIX 2005 Annual Technical Conference, (Online), Apr. 10, 2005, pp. 189-98, XP002381191, Ahaheim, CA, US, ISBN: 1-931971-28-5, available at: http://www.usenix.org/events/usenix05/tech/freenix/full_papers/zeldovich/zeldovich.pdf.

* cited by examiner

METHOD AND APPARATUS FOR UPDATING A GRAPHICAL DISPLAY IN A DISTRIBUTED PROCESSING ENVIRONMENT USING COMPRESSION

CROSS-REFERENCE TO RELATED PATENT APPLICATIONS

This application is a continuation of co-pending U.S. application Ser. No. 10/906955, filed on Mar. 14, 2005, the entire contents of which are incorporated herein by reference.

BACKGROUND OF THE INVENTION

Distributed computer systems utilize the technique of distributing application execution. More specifically, an application server locally executes an application program and provides the application output data to clients/network users who then display the results on a display screen that is locally-coupled to their local computer. Distributed systems can make the best use available computing resources, i.e., the more capable server performs compute and memory intensive application processing functions while, the client that may be less capable computationally but potentially more capable with respect to video performance, displays the output. In one type of distributed computing system, a user of the client views application output data on a local display during the execution of the application program and interacts with the application program via keyboard, mouse inputs, or other device inputs. The user's inputs correspond to requests to the application server to perform certain actions that affect the operation of the application program. The application server passes these requests to the application for further processing. The application server also intercepts application output data generated by the application program, and typically targeted to the operating system of the application server, and transmits all or part of the data to the client for display. From the perspective of the user, the application program seems to be executing locally even though it is actually being executed on a remote server and displayed locally.

There are various protocols that provide the above-described functionality. One example of such a protocol is the Remote Desktop Protocol ("RDP") distributed by Microsoft Corporation of Redmond, Washington. RDP is based on, and an extension of, the ITU T.120 family of protocols. RDP is a multiple-channel capable protocol that allows for separate virtual channels carrying device communication and presentation data from the application server, as well as encrypted client mouse and keyboard data. RDP uses its own video driver to render display output by constructing the rendering information into network packets using RDP protocol and sending them over the network to the client. On the client, RDP receives rendering data and interprets the packets into corresponding Microsoft Win32 graphics device interface (GDI) API calls. For the input path, client mouse and keyboard events are redirected from the client to the server.

Another protocol that provides similar functionality is the Independent Computing Architecture ("ICA") sold by Citrix Systems of Ft. Lauderdale, Fla. ICA is a protocol that enables separate screen updates and user input processing from the rest of an application's logic. All application logic executes on a first computing system and only screen updates, mouse movements, and keystrokes are transmitted during a session between the displaying computing system and the first computing system.

Distributed application processing systems have performed well for typical, office applications. However, certain applications that are graphically intense can adversely affect the performance of a distributed application processing system. Examples of graphically intense applications can include, but are not limited to, computer-aided drafting ("CAD") applications, video editing applications, and computer games. In these graphically-intense applications, display updates typically require a large amount of bandwidth because they are large, bitmap images. This problem is exacerbated when an executing application program sends multiple display updates in a short period of time, such as when a CAD/CAM program rotates a three-dimensional model of a device for the user to view. The delay in output due to the large size of the respective screen updates adversely affects user experience and interaction with the application program and makes use of the application program impractical in a distributed application processing environment.

BRIEF SUMMARY OF THE INVENTION

In one aspect, the invention features a method of updating a remote display unit that communicates with a computing system. The method includes accessing display update information from an update queue that stores drawing commands issued by an application executing on the computing system, caching the display update information, applying a lossy compression algorithm to the display update information to create a lossy display update, and transmitting the lossy update to the remote display. The method also includes applying a lossless compression algorithm to the display update information in the cache to create a lossless display update and transmitting the lossless display update a predetermined of time after transmitting the lossy update.

In one embodiment, the method includes setting the operational mode of the computing system to require the application of the lossy compression algorithm. In another embodiment, the method includes determining if the display update information has been previously transmitted to the remote display unit and signaling the remote display unit when the display update information has been previously transmitted.

In another aspect, the invention features a system for updating a display unit remotely located from a computing system. The system includes a queue, a cache, a thread, and a driver. The queue stores at least one system drawing call representative of a graphical output of an application program executing on the computer system. The cache stores the at least one drawing call. The thread accesses the queue and executes a lossy compression algorithm on the at least one drawing call of the queue to generate a lossy display update. The thread also accesses the cache and executes a lossless compression algorithm on the at least one drawing call of the cache to generate a lossless display update. The driver transmits the lossy display update to the remote display unit, waits a predetermined time period, and then transmits the lossless display update after the expiration of the predetermined time period.

BRIEF DESCRIPTION OF THE DRAWINGS

The invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION OF THE INVENTION

The present invention features systems and methods for updating a remote display unit 110. In one aspect, the invention combines a "queue-and-toss" shared queue with the use of a lossy and lossless compression to increase the efficiency with which the remote display is updated without adversely affecting the end-user experience.

Figure 1:
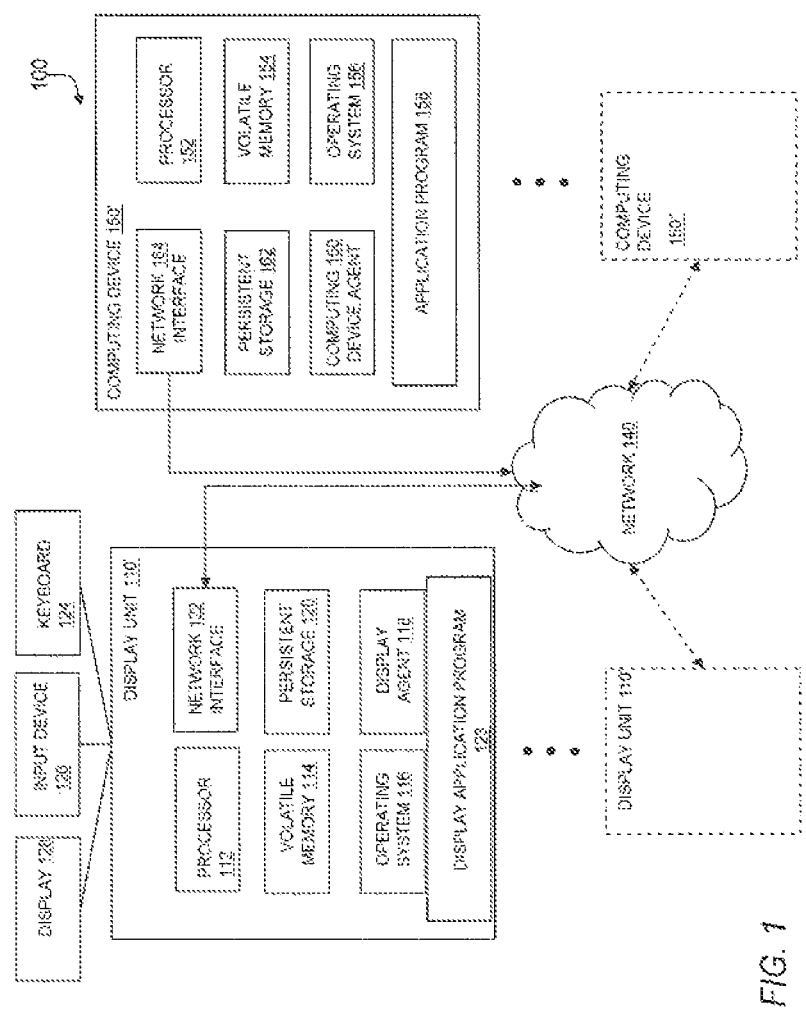
FIG. 1 is a block diagram of a distributed application processing system in which principles of the present invention can be practiced.

With reference to FIG. 1, a distributed application processing system 100 includes one or more remote display units 110', 110" (hereinafter each remote display unit or plurality of remote display units is generally referred to as 110) in communication with one or more computing devices 150', 150" (hereinafter each computing device or plurality of computing devices is generally referred to as 150) via a communications network 140. The network 140 can be a local-area network (LAN), a medium-area network (MAN), or a wide area network (WAN) such as the Internet or the World Wide Web. Users of the remote display unit 110 can be connected to the network 140 through a variety of connections including standard telephone lines, LAN or WAN links (e.g., T1, T3, 56kb, X.25), broadband connections (e.g., ISDN, Frame Relay, ATM), and wireless connections (e.g., IEEE 802.11). The connections can be established using a variety of communication protocols (e.g., TCP/IP, IPX, SPX, NetBIOS, and direct asynchronous connections). In some particularly advantageous embodiments, the protocol used may be the Independent Computing Architecture protocol manufactured by Citrix Systems, Inc. of Fort Lauderdale, Fla. or the Remote Display Protocol manufactured by Microsoft Corporation of Redmond, Wash.

The bandwidth of the network 140 is one factor that affects the performance of the distributed application processing system 100. A network 140 having a larger bandwidth relative a second network typically can support transmission of more display data to the remote display unit 110. During operation of the distributed application processing system 100, the bandwidth of the network 140 fluctuates. As data is transmitted through the network 140 the amount of available bandwidth of the network is reduced. As display data is received by the remote display unit 110, the available bandwidth of the network 140 increases, assuming no additional data is placed on the network. One aspect of the invention features applying a lossy compression algorithm to bitmap images prior to transmitting the images to the remote display unit 110. This feature reduces the amount of network traffic and therefore improves the speed at which the remote display unit 110 receives updates.

The remote display unit 110 typically includes a processor 112, a volatile memory 114 (e.g., RAM cache), an operating system 116, a display agent 118, a persistent storage memory 120, a network interface 122 (e.g., a network interface card), a display application program 123, a keyboard 124, one or more input device 126 (e.g., a mouse, a track ball, a space ball, a light pen and tablet, a stylus or any other input device), and a display 128. Operating system 116 can include, without limitation, Windows 3.x, Windows 95, Windows 98, Windows NT 3.51, Windows NT 4.0, Windows 2000, Windows CE, MAC/OS, Java, PALM OS, SYMBIAN OS, LINUX, SMARTPHONE OS, and UNIX. The display agent 118 receives commands and data from the computing device 150 and from a user (not shown) of the remote display unit 110. The client agent 118 uses the received information when interacting with other components of the remote display unit 110 (e.g., when directing the operating system 116 to output data onto the display 128). The display agent 118 also transmits requests and data to the computing device 150 in response to computing device-issued commands or user actions at the remote display unit 110.

The remote display unit 110 can be any personal computer (e.g., 286, 386, 486, Pentium, Pentium II, Macintosh computer), Windows-based terminal, Network Computer, wireless device, information appliance, RISC Power PC, X-device, workstation, minicomputer, main frame computer, cellular telephone or other computing device that provides sufficient memory for executing the operating system 116 and the display application program 123. It should be understood that the display application program 123 can be integral with the operating system 116 or a stand-alone application. The display presentation program 123 uses commands and data sent to it by the computing device 150 across the network 140 to render a graphical output to the user of the display 128 of the display unit.

Similarly, the computing device 150 may include a processor 152, a volatile memory 154, an operating system 156, an application program 158, a computing device agent 160, persistent storage memory 162, and a network interface 164. The computing device agent 160 interfaces with the display agent 118 and other components of the computing device 150 to support the remote display and operability of the application program 158. In the distributed application processing system 100, execution of application programs occurs primarily on a computing device 150 and the user interface produced by application execution is transmitted over the network 140 to the remote display unit 110. The user provides inputs, such as keystrokes and mouse movements, at the display unit 110 which are transmitted over the network 140 to the computing device 150 to instruct the application programs to perform further tasks.

Each computing device 150 hosts one or more application programs 158 that can be accessed by the remote display units 110. Examples of such applications include word processing programs such as MICROSOFT WORD and spreadsheet programs such as MICROSOFT EXCEL, both manufactured by Microsoft Corporation of Redmond, Wash., financial reporting programs, customer registration programs, programs providing technical support information, customer database applications, application set managers, or computer-aided design and manufacturing applications, such as AUTOCAD sold by Autodesk of San Rafael, Calif., CATIA sold by Dassault Systems of Suresnes Cedex, France, and PRO/ENGINEER sold by Parametric Technology Corporation of Needham, Mass.

During execution of the application program 158, a computing device 150 communicates with the remote display unit 110 over a transport mechanism (part of the computing device agent 160). In one embodiment, the transport mechanism provides multiple virtual channels and one of the virtual channels provides a protocol for transmission of graphical screen data from the computing device 150 to the remote display unit 110.

Figure 2:
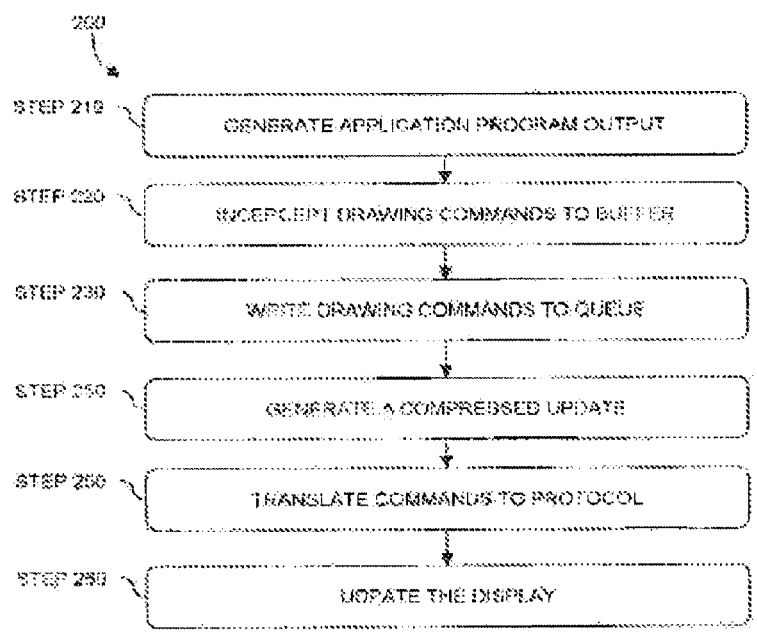
FIG. 2 is a flow chart depicting an operational mode of the distributed application processing system of FIG. 1.

Referring now to FIG. 2, and in brief overview, a method 200 for transmitting screen updates to the remote display unit 110 includes the step of generating (step 210) application program output such as drawing commands; intercepting and/or copying (step 220) the drawing commands; writing (step 230) the drawing commands to the a queue and/or a buffer; compressing (step 240) an image in the buffer; translating (step 250) the drawing command of the queue into protocol commands; and transmitting (step 260) the protocol commands to the remote display unit 110.

In more detail, the application program 158 generates output (step 210) and issues drawing commands indicative of the graphical output of the application program 158. Examples of drawing commands can include, but are not limited to, raster operations, GDI commands provided by WINDOWS-based operating systems, and QUICKDRAW or QUARTZ commands provided by MAC/OS-based operating systems. It should be understood that other types of drawing commands can also be used with the invention. For easy of use, throughout the rest of the specification, drawing commands are referred to as GDI commands.

A protocol driver intercepts (step 220), or "hooks," the drawing commands issued by the application program 158. The protocol driver is typically not associated with the application program 158.

The drawing commands are written (step 230) to a queue that is accessible by two or more threads executing on the computing device 150. In some embodiments, lower-level commands, such as interface calls to a device driver associated with the graphical display of the computing device 150 are also hooked and written to the queue. In still other embodiments, the graphical display interface commands may be duplicated rather than intercepted. In these embodiments, the display of the application program output data on a virtual display (i.e., a buffer) of the computing device 150 and the remote display unit 110 will be substantially similar, if not identical. In these embodiments, the drawing commands also may be provided to operating system 116 for processing and the output of the operating system stored in a buffer of the computing device 150.

When the computing device 150 prepares to send an update to the remote display unit 110, certain portions of the update may be subjected to a lossy compression algorithm (step 240). For example, if the drawing command of the queue indicates that a bitmap image stored in a buffer of the computing device 150 is to be sent to the remote display unit 110, the bitmap is copied from the buffer and subjected to a lossy compression algorithm before transmission. In one embodiment, the application of lossy compression is controlled by manually invoking an operational mode by setting a global flag. The compression mode can be switched on and off by the user depending on the desired operation of the distributed application computing system 100. In one embodiment, the lossy compression algorithm is a photographic codec (e.g., JPEG compression using arithmetic encoding). While this type of encoding is more processor intensive, it can decrease the size of the display update frame by as much as thirty percent relative to other codecs (e.g., JPEG compression using optimized Huffman encoding). In other embodiments, other lossy compression techniques are used.

The computing device 150 translates (step 250) the drawing commands in the queue and the compressed buffer contents, if present, into protocol commands. In one embodiment, the protocol is the RDP protocol distributed by Microsoft Corporation of Redmond, Washington. In a preferred embodiment, the ICA protocol distributed by Citrix Systems, Inc. of Ft. Lauderdale, Florida is used. Subsequently, the computing device 150 transmits (step 260) the protocol to the remote display unit 110.

Figure 3:
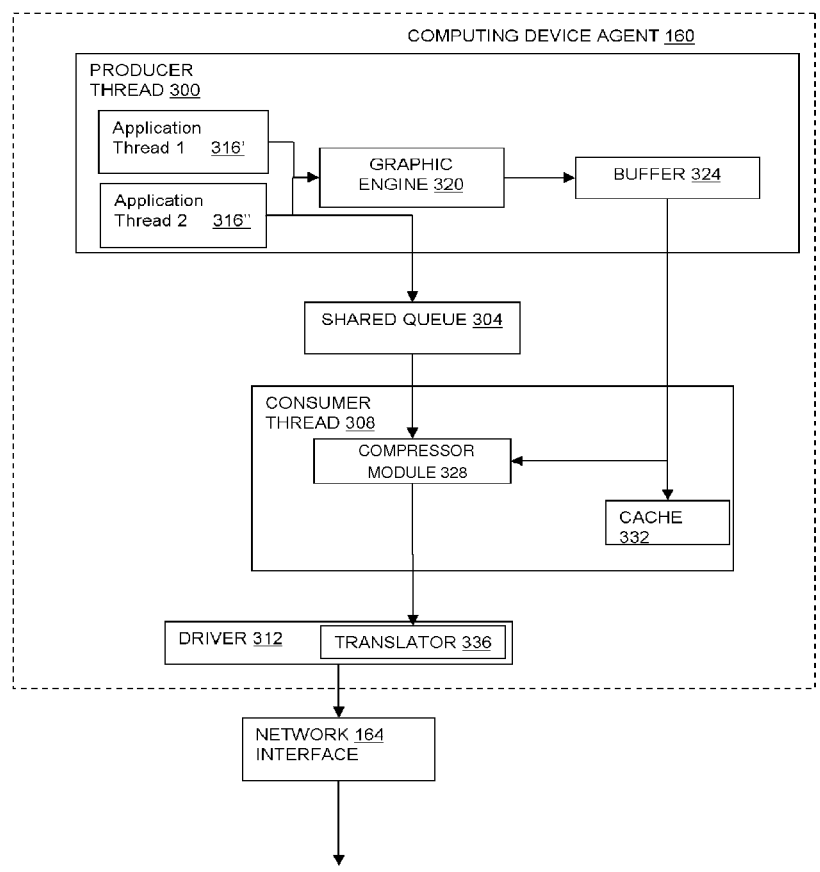
FIG. 3 is a block diagram of an embodiment of the computing agent of FIG. 1.

FIG. 3 is a block diagram of an embodiment of the computing device agent 160 of FIG. 1. The computing device agent 160 includes a producer thread 300, a shared queue 304, a consumer thread 308, and a driver module 312. The producer thread 300 is in communication with the shared queue 304. The consumer thread 308 is also in communication with shared queue 304 and, in addition, is in communication with the driver module 312.

The producer thread 300 includes one or more application threads 316', 316" (referred to generally as application thread 316) in communication with a graphics engine 320. Also included in the producer thread 300 is a buffer 324 that is in communication with the graphics engine 320. The buffer 324 can be a portion of the volatile memory 154.

The application threads 316 issue the drawing commands, such as GDI commands, to graphics engine 320. In one embodiment, the drawing commands are hooked, copied, and sent to the shared queue, in addition to being sent to the graphics engine 320. The graphics engine 320 renders the GDI commands into the buffer 324. The output of the graphic rendering engine can be a complex bitmap or similar graphical representation. In essence, the buffer 324 functions as a "virtual" display for storing display image for later transmission to the remote display unit 110. In one embodiment, the graphics engine is the GDI support for rendering GDI requests into a memory buffer.

Before writing the GDI commands to the shared queue 304, the producer thread 300 examines the shared queue to determine if the new command obscures and renders obsolete a command previously existing in the shared queue. This method is known as the "queue-and-toss" method. This feature provides a method to reduce the number of updates that are sent to the remote display unit. In one embodiment, a rectangle collision algorithm is used to determine if a new command obscures an old command.

The shared queue 304 stores and queues the GDI commands until the consumer thread 308 removes them from the shared queue 304. The shared queue 304 can be a portion of the volatile memory 154. Although shown as being separate from each of the producer thread 300 and the consumer thread 308, it should be understood that the shared queue 304 can be part of either thread as long as it is accessible by the each of the producer thread 300 and the consumer thread 308.

The consumer thread 308 is in communication with the shared queue 304 and includes a compressor module 328 and a cache 332. Functionally, the consumer thread 308 periodically consumes the shared queue 304 and, in conjunction with the driver module 312, generates protocol commands that are communicated to the remote display unit 110. In one embodiment, the periodicity with which the consumer thread 308 access the shared queue 304 is controlled by four factors: 1) the time since the last update was sent to the remote display unit 110; 2) the amount of free buffering space in the driver module 312; 3) the availability of the storage space in the cache 332; and 4) the amount of space available in the shared queue for additional GDI commands. In another embodiment, the periodicity of consumer thread 308 is random and continually changing between two bounding times (e.g., 40 milliseconds to 1 second).

The compressor module 328 is in communication with the shared queue 304 and the buffer 324. When the system 100 operates in the compression mode as indicated by the global flag, the compressor module performs lossy compression on the contents of the buffer 324 prior to transmitting the display update to the remote device unit 110.

The cache 332 stores the original contents of the buffer 324, that is, the uncompressed copy of image. Additionally, the cache 332 stores bounding rectangle information that indicates which portions of the display image have been subjected to lossy compression so that lossless version of the display image can be later transmitted to the remote display unit 110. The cache also stores information descriptive of whether a bitmap has already been transmitted to the remote display 110.

The driver module 312 includes a translator module 336 for formatting the display update frame according to the communication protocol of the distributed application processing system 100. Once translated, the driver module 312 transfers the protocol commands to the network interface 164 for transmission to the remote display unit 110.

Figure 4:
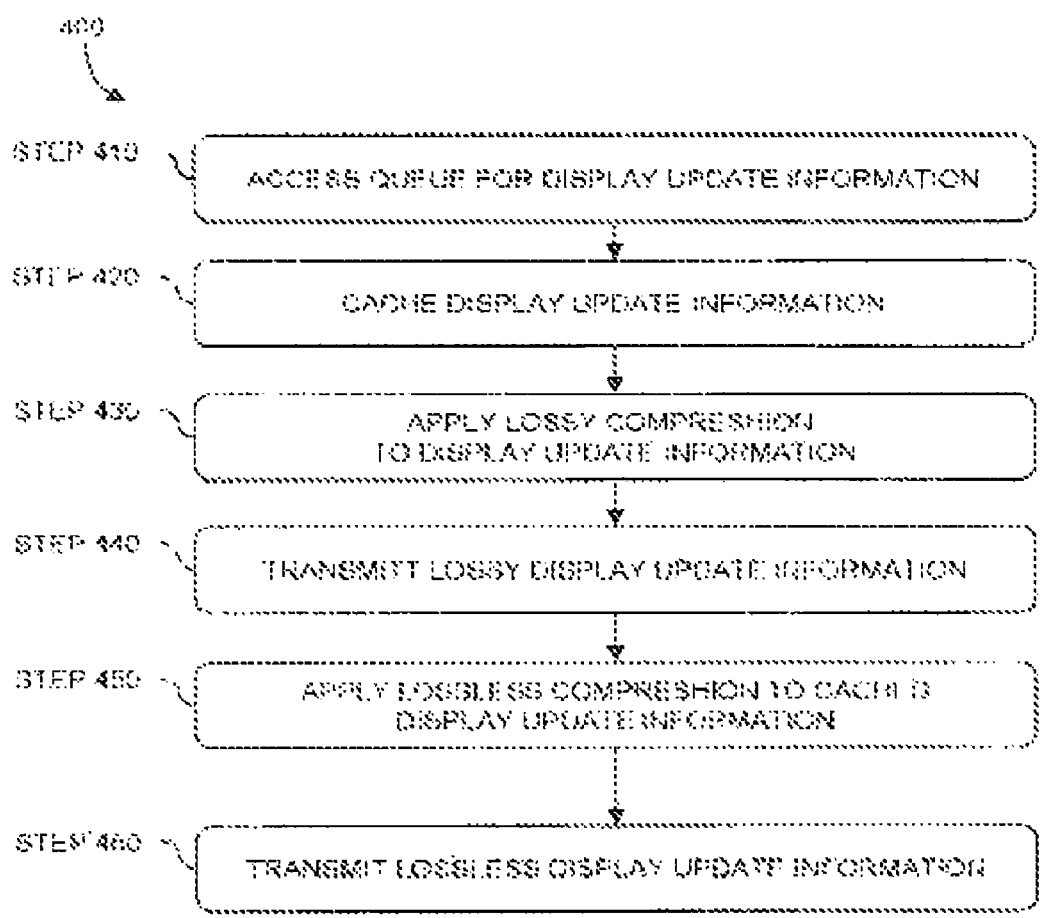
FIG. 4 is a flow chart of an embodiment of a method of updating a remote display unit in accordance with principles of the present invention.

With reference to FIG. 4, a method 400 of updating a remote display unit that communicates with computing system features accessing (step 410) the shared queue 304 to retrieve display update information; caching (step 420) the display update information; applying (step 430) lossy compression to the display update information; transmitting (step 440) the lossy compressed information to the remote display unit 110; applying (step 450) a lossless compression algorithm to the cached display update information; and transmitting (step 460) the lossless display information to the remote display unit 110.

In more detail, the consumer thread 308 periodically accesses (step 410) the shared queue 304 to retrieve display update information. In one embodiment, the display update information includes GDI drawings commands and a bitmap image from the buffer 324. In some embodiments, the consumer thread 308 accesses the shared queue in random time intervals. In a preferred embodiment, when the lossy compression mode is enable the consumer thread access the shared queue every 500 milliseconds.

After consuming the display update information, the consumer thread 308 caches (step 420) a cyclic redundancy check ("CRC") key that is subsequently used to determine if the image is already in the volatile memory 154. In some embodiments, the consumer thread 308 performs a check to determine of the image of the buffer 324 has previously been transmitted to the remote display unit 110. If the image has previously been transmitted, the remote display unit is signaled to use the image previously sent by the computing device 150.

A lossy compression algorithm is applied (step 430) to the display update information to create a lossy display update. In one embodiment, the entire display update is lossy compressed. In other embodiments, only portions of the display update information are lossy compressed. In such embodiments, a list of the regions that are lossy compressed is stored as an array in the cache 332.

The lossy display update is transmitted (step 440) to the remote display unit. Subsequently, the consumer thread 308 pauses ("sleeps") for 500 milliseconds, as previously described. After the expiration of the 500 millisecond, the consumer thread 308 examines the shared queue 304 again to determine if addition drawing commands were issued by the application program threads 316.

If no new drawing commands are present in the shared queue 304, a lossless compression algorithm is applied (step 450) to a copy of the display in the buffer 324 to generate a lossless display update, which is then transmitted (step 460) to the remote display unit 110.

Although the present invention has been described with reference to specific details, it is not intended that such details should be regarded as limitations upon the scope of the invention, except as and to the extent that they are included in the accompanying claims

What is claimed as new and desired to be protected by Letters Patent of the United States is:

1. A system comprising a driver module and a thread executing on a first computing device, the thread configured to:
   periodically retrieve display update information by:
      retrieving a bitmap image from a display buffer,
      examining a shared queue to determine whether or not there are drawing commands in the shared queue, and
      retrieving, when there are drawing commands in the shared queue, one or more drawing commands from the shared queue;
   create a compressed display update from the display update information; and
   transmit, by the driver module, via a network interface, the compressed display update to a remote display device;
   wherein the compressed display update is:
      a lossy display update created using a lossy compression algorithm when examining the shared queue determined that there were drawing commands in the shared queue; and
      a lossless display update created using a lossless compression algorithm when examining the shared queue determined that there were no drawing commands in the shared queue.

2. The system of claim 1, wherein a periodicity for the thread to retrieve display update information is controlled by one or more of:
   i) a time since a previous update was sent to the remote display;
   ii) an amount of free buffering space in the driver module;
   iii) availability of storage space in the cache; and
   iv) an amount of space available in the shared queue for additional drawing commands.

3. The system of claim 1, wherein a periodicity for the thread to retrieve display update information is random and continually changing between two bounding times.

4. The system of claim 1, wherein the thread is configured to cache a cyclic redundancy check key for the display update information and to use the key to determine if an image has previously been transmitted to the remote display.

5. The system of claim 4, wherein the remote display is signaled to use the image previously transmitted.

6. The system of claim 1, wherein the driver module transmits a lossless display update for a bitmap image previously transmitted in a lossy display update.

7. A method comprising:
   periodically retrieving, by a thread executing on a computing device, display update information by:
      retrieving a bitmap image from a display buffer,
      examining a shared queue to determine whether or not there are drawing commands in the shared queue, and
      retrieving, when there are drawing commands in the shared queue, one or more drawing commands from the shared queue;
   creating, by the thread, a compressed display update from the display update information; and
   transmitting, by a driver module, via a network interface, the compressed display update to a remote display device;
   wherein the compressed display update is:
      a lossy display update created, by the thread, using a lossy compression algorithm when examining the shared queue determined that there were drawing commands in the shared queue; and
      a lossless display update created, by the thread, using a lossless compression algorithm when examining the shared queue determined that there were no drawing commands in the shared queue.

8. The method of claim 7, wherein a periodicity for the thread to retrieve display update information is controlled by one or more of:
  i) a time since a previous update was sent to the remote display;
  ii) an amount of free buffering space in the driver module;
  iii) availability of storage space in the cache; and
  iv) an amount of space available in the shared queue for additional drawing commands.

9. The method of claim 7, wherein a periodicity for the thread to retrieve display update information is random and continually changing between two bounding times.

10. The method of claim 7, further comprising:
  caching a cyclic redundancy check key for the display update information and
  using the key to determine if an image has previously been transmitted to the remote display.

11. The method of claim 10, wherein the remote display is signaled to use the image previously transmitted.

12. The method of claim 7, wherein the driver module transmits a lossless display update for a bitmap image previously transmitted in a lossy display update.

13. The method of claim 7, further comprising translating the drawing commands in the shared queue and the bitmap image from the display buffer into protocol commands.

14. A system comprising a driver module and a thread executing on a first computing device, the thread configured to:
  examine a shared queue for drawing commands issued by an application program to determine whether or not there are new drawing commands in the shared queue;
  retrieve display update information by retrieving any new drawing commands from the shared queue and retrieving a bitmap image from a display buffer;
  apply a lossy compression algorithm to the display update information to create a lossy display update and transmit, via the driver module, the lossy display update to a remote display when examining the shared queue determined that there were new drawing commands in the shared queue; and
  apply a lossless compression algorithm to the display update information to create a lossless display update and transmit, via the driver module, the lossless display update to the remote display when examining the shared queue determined that there were no new drawing commands in the shared queue.

15. The system of claim 14, wherein the thread is further configured to pause before a repeated examination of the shared queue.

16. The system of claim 14, wherein the driver module includes a translator module for formatting a display update according to a communication protocol.

17. The system of claim 16, wherein the driver module is configured to transfer a formatted display update to a network interface for transmission to the remote display.

18. The system of claim 14, wherein the thread has periodicity that is random and continually changing between to bounding times.

19. The system of claim 14, wherein the thread has periodicity that is controlled by one or more of:
  i) a time since a previous update was sent to the remote display;
  ii) an amount of free buffering space in the driver module;
  iii) availability of storage space in the cache; and
  iv) an amount of space available in the shared queue for additional drawing commands.

20. The system of claim 14, wherein the thread consumes drawing commands from the shared queue.

* * * * *